United States Patent [19]

Becker et al.

[11] 4,230,514

[45] Oct. 28, 1980

[54] PROCESS FOR MAKING FORM SETS FROM CARBONLESS COPY PAPER SHEETS

[75] Inventors: William J. Becker; Kenneth D. Glanz; Peter L. Foris; Robert W. Brown; Jerrold L. Anderson, all of Appleton, Wis.

[73] Assignee: Appleton Papers Inc., Appleton, Wis.

[21] Appl. No.: 928,109

[22] Filed: Jul. 26, 1978

[51] Int. Cl.[2] .................................................. C09J 5/00

[52] U.S. Cl. .................................. 156/305; 11/1 AD; 156/314; 156/315; 156/329; 156/477 B; 281/21 R; 282/22 R; 282/27.5; 282/24 R; 282/DIG. 2; 427/150; 427/411; 428/194; 428/914

[58] Field of Search ............... 156/291, 315, 305, 329, 156/314, 477 B; 427/150, 411; 428/194, 914; 282/27.5, 22 R, 24 R, DIG. 2; 281/21 R; 11/1 AD

[56] References Cited

U.S. PATENT DOCUMENTS

| | | | |
|---|---|---|---|
| 2,612,463 | 9/1952 | Brown | 281/21 R |
| 2,930,632 | 3/1960 | Winders et al. | 156/305 |
| 3,393,925 | 7/1968 | Calvert | 156/305 |
| 4,097,619 | 6/1978 | Davis et al. | 427/150 |

FOREIGN PATENT DOCUMENTS

| | | |
|---|---|---|
| 49-99635 | of 1974 | Japan . |
| 53-12844 | of 1978 | Japan . |
| 53-12845 | of 1978 | Japan . |
| 1263510 | 2/1972 | United Kingdom . |

*Primary Examiner*—John J. Gallagher
*Attorney, Agent, or Firm*—Birch, Stewart, Kolasch & Birch

[57] ABSTRACT

A process for separating a collated stack of carbonless copy paper sheets into form sets, which comprises pretreating the edge of the stack of sheets to be padded with a non-aqueous material, drying, applying an adhesive composition, drying and separating the unit sets.

9 Claims, No Drawings

PROCESS FOR MAKING FORM SETS FROM CARBONLESS COPY PAPER SHEETS

BACKGROUND OF THE INVENTION

1. Field of the Invention

The present invention pertains to a process for producing a series of unit set multi-ply carbonless copy paper forms from a stack (lift) of collated sheets. More specifically, the invention relates to a pretreatment or priming of the edge of the lift to which adhesive is to be applied (padded) with certain non-aqueous liquids or solutions. The pretreated edge is then dried, an edge-padding adhesive is applied, the edge is again dried and the lift is separated into individual multi-ply carbonless paper forms.

2. Description of the Prior Art

For many years carbonless copy paper has been made into form sets from a lift of collated sheets by applying an adhesive to one edge of the lift, drying the padded edge and fanning the lift into individual form sets. British patent 1,263,510 discloses an improvement in edge-padding performance by using as the adhesive a mixture of an aqueous solution of a gelatin derivative and an aqueous emulsion of a polymer. Further improvements in edge-padding are taught in U.S. Pat. Nos. 3,960,638; 3,963,553; 3,970,500; 3,970,501; and 4,041,193 where a naphthalene sulfonic acid-formaldehyde condensate is used in an edge-padding adhesive formulation in various combinations with materials such as water-soluble polymers, water-soluble binders, water-soluble metal salts, polymer emulsions, surface active agents and latexes. Japanese Patent Publication Nos. 12844/1978 and 12845/1978 teach the use of a surface active agent with an aqueous solution of a synthetic polymer adhesive or an aqueous emulsion of a synthetic polymeric adhesive, respectively, in an edge padding adhesive formulation. Japanese Patent Disclosure No. 99635/1974 teaches an aqueous edge-padding adhesive composition comprising a vinyl acetate-maleic acid copolymer and various alcohols.

SUMMARY OF THE INVENTION

The present invention is concerned with a pretreatment process to improve the edge-padding behavior of carbonless copy paper. Carbonless copy paper either as manufactured or upon aging can possess a wide range of properties which relate to edge-padding performance. It has been discovered that pretreatment or priming of an edge of a lift of precollated carbonless copy paper sheets with certain non-aqueous liquids, with or without additional materials, results in an improvement in the edge-padding performance thereof.

It is an object of the present invention to provide a process for separating simply and correctly a stack of carbonless copy paper sheets into unit sets, while avoiding and overcoming many of the problems and deficiencies encountered in the prior art procedures.

Another object of the present invention is to provide materials which when utilized as a pretreatment or primer will render a stack of carbonless copy paper sheets capable of being edge-padded successfully with conventional edge-padding adhesives.

These and other objects and advantages of the present invention will be apparent to those skilled in the art from the following description.

DETAILED DESCRIPTION OF THE INVENTION

In the present invention "edge-padding" designates the process whereby form sets can be made from a stack of collated carbonless copy paper sheets by applying an adhesive to one edge of the stack, drying the adhesive and fanning the stack into individual form sets. When edge-padding is performed on carbonless copy paper combinations, the following types of sheets can be used: sheets produced by coating a microcapsule layer containing a color former on a support (CB or coated back); sheets produced by coating a color-developing layer on a support (CF or coated front); and sheets produced by coating a color-developing layer on one surface and the microcapsule layer on the other surface of a support (CFB or coated front and back).

The collated stack of carbonless copy paper sheets can be assembled in the sequence, for example, CB-CF, CB-CF, CB-CF, . . . , CB-CF, or CB-CFB-CFB - . . . - CF, CB-CFB-CFB- . . . - CF, . . . , CB-CFB-CFB- . . . - CF. When an adhesive composition is applied to one edge of the stack, dried and the dried stack is fanned, the sheets are selectively adhered and the stack separated into complete unit set forms. The unit forms take the configuration as described above, i.e., either CB-CF or CB-CFB-CFB- . . . - CF. Selective adherence occurs because the adhesive bonds the coated surfaces of the collated forms, but not the uncoated surfaces. When the dried stack is fanned, separation occurs between the uncoated surfaces. Thus, by this process a stack of carbonless copy papers is easily converted to a series of unit set forms which are then ready for use.

The above process is performed quite easily and simply with most carbonless copy paper. However, occasionally some carbonless copy paper sheets within the collated stack, as made or upon aging, will not respond satisfactorily to such an edge-padding treatment when prior art adhesives are used in a single step process. Bonding between sheets will sometimes occur between uncoated surfaces. This phenomenon is called blocking. Occasionally, the bonding between coated surfaces will be insufficient and bonding between uncoated surfaces will occur to such a degree that during fanning the sheets will separate at the coated interfaces. This phenomenon is called reverse padding in the case of two-part forms. Also, proper non-bonding between uncoated surfaces will sometimes be accompanied by weak bonding between some of the coated surfaces. In this case during fanning the stack separates, in part, into individual sheets. This situation is called fall-apart. The present invention makes it possible to overcome all of these problems.

Illustrative of the non-aqueous materials for the pretreatment or priming step of the process of the present invention are:

(1) Materials applied with a brush:

Substantially volatile aliphatic hydrocarbons (e.g., $C_7$-$C_{10}$ aliphatic hydrocarbons such as heptane, octane, nonane, decane or isomers thereof; Nujol (a mixture of long chain saturated hydrocarbons); organic solvent solutions of silicone resins (e.g., organosiloxane polymers in methylene chloride); solutions of resins in aliphatic hydrocarbon solvents (e.g. "Piccolastic" resins (resins produced from a mixture of styrene and styrene homologues) in mineral spirits).

(2) Materials applied as a spray:

A silicone resin solution; pigmented paints and enamels.

Exemplary pigmented paint sprays which can be used in the pretreatment step of the present invention include paints containing titanium dioxide, carbon black, talc, diatomaceous silica, aluminum powder or various mixtures thereof as the pigment in a suitable vehicle (e.g., hydrocarbon resins or vinyl toluene alkyd resins) and solvent (e.g., aliphatic and aromatic hydrocarbons, ketones and mixtures thereof). Such paint compositions may further contain conventional driers such as tung oil and conventional drying accelerators.

The preferred embodiment of the invention comprises pretreating the edge of the stack of sheets to be padded with a silicone resin solution by spraying.

The properties that such a pretreatment or priming material should possess to perform satisfactorily in the process of the present invention include:

(1) Non-interference with the functioning of the later applied edge-padding adhesive.

(2) Non-interference with the normal imaging of the carbonless paper imaging in the form.

(3) Will not discolor the carbonless paper.

(4) Will not adversely affect the edge-padding performance of sheets in the stack which, according to their own properties, would not have required a pretreatment process.

(5) Will "dry" or "set" quickly so that the adhesive application step can quickly follow the pretreatment step.

Conventional edge-padding adhesives known in the art such as acrylic latex adhesive formulations are then applied to the pretreated or primed edge after it has substantially dried.

The pressure-sensitive or carbonless copy paper systems to be edge-padded by the process of the present invention can be any of the coated systems well known in the art. Pressure-sensitive mark-forming systems generally comprise sheet support material having unreacted mark-forming components disposed thereon and a liquid solvent in which one or both of the mark-forming components is soluble, said liquid solvent being present in such form that it is maintained in an isolated manner by a pressure-rupturable barrier from at least one of the mark-forming components until the application of pressure causes a breach of the barrier in the area delineated by the pressure pattern. The mark-forming components are thereby brought into reactive contact, producing a distinctive mark.

The pressure-rupturable barrier, which maintains the mark-forming components in isolation preferably comprises a microencapsulated liquid solvent solution. The microencapsulation process utilized can be chosen from the many known in the art. Well known methods are disclosed in U.S. Pat. Nos. 2,800,457; 3,041,289; 3,533,958; 3,755,190; and 4,001,140. Any of these and other methods are suitable for encapsulating the chromogenic compounds used to coat paper edge-padded by the process of this invention.

The method of marking comprises providing a chromogenic compound and bringing such chromogenic compound into reactive contact, in areas where marking is desired, with an acidic color-developing substance to produce a dark-colored form of the chromogenic compound.

The acidic color-developing materials can be any compound within the definition of a Lewis acid, i.e., an electron acceptor. These materials include clay substances such as attapulgite, bentonite and montmorillonite and treated clays such as silton clay as disclosed in U.S. Pat. Nos. 3,622,364 and 3,753,761, materials such as silica gel, talc, feldspar, magnesium trisilicate, pyrophyllite, zinc sulfate, zinc sulfide, calcium sulfate, calcium citrate, calcium phosphate, calcium fluoride and barium sulfate, aromatic carboxylic acids such as salicylic acid, derivatives of aromatic carboxylic acids and metal salts thereof as disclosed in U.S. Pat. No. 4,022,936 and acidic polymeric materials such as phenol-formaldehyde polymers, phenol-acetylene polymers, maleic acid-rosin resins, partially or wholly hydrolyzed styrene-maleic anhydride copolymers and ethylene-maleic anhydride copolymers, carboxy polymethylene and wholly or partially hydrolyzed vinyl methyl ether maleic anhydride copolymers and mixtures thereof as disclosed in U.S. Pat. No. 3,672,935.

Particularly useful as acidic color-activating substances are the metal-modified phenolic resins. U.S. Pat. No. 3,732,120 discloses record sheet material coated with resins of this type. An example of a composition which can be coated onto the surface of a sheet for reaction with a chromogenic compound is as follows:

| Coating Composition | Percent by Weight |
|---|---|
| Zinc-modified phenolic polymer | 13.6 |
| Paper coating kaolin | 67.9 |
| Calcium carbonate | 6.0 |
| Styrene-butadiene latex | 6.0 |
| Etherified corn starch | 6.5 |

In the practice of the present invention, a stack of collated carbonless copy paper sheets is jogged to the edge to be edge-padded. The edge is sprayed with the pretreatment material or is brushed with the pretreatment material until the edge surface is visibly damp. The stack is allowed to dry, is fanned and is rejogged. The edge-padding adhesive is applied to the edge with a brush, the adhesive is dried and the stack is fanned into individual unit set forms. In the case of pretreatment with an aliphatic hydrocarbon alone, the adhesive is applied before complete evaporation of the aliphatic hydrocarbon.

Using the above procedure, five form sets were edge-padded in a non-limitative example of the present invention using the prior art adhesive formulations shown below and using a silicone aerosol spray pretreatment. The repeating units of the collated sheets of the form sets are shown in the following table according to the basis weight of a 1300 ft$^2$ ream of the paper.

| | Edge-Padding Results | | |
|---|---|---|---|
| Form Sets | Prior Art Adhesive #1 | Prior Art Adhesive #2 | Silicone Resin Spray Pretreatment followed by Adhesive #2 |
| 15 lb. CB | Blocking | Blocking | Perfect |

-continued

| Form Sets | Edge-Padding Results Prior Art Adhesive #1 | Prior Art Adhesive #2 | Silicone Resin Spray Pretreatment followed by Adhesive #2 |
|---|---|---|---|
| 17 lb. CFB | | | |
| 17 lb. CFB | | | |
| 15 lb. CF | | | |
| 30 lb. CB | Slight blocking | Blocking | Good |
| 17 lb. CFB | Good bonds | Reverse Padding | |
| 15 lb. CF | | CB-CFB very weak bond | |
| 15 lb. CB | CB-CFB bond | CB-CFB bond | Good |
| 17 lb. CFB | fall-apart | fall-apart | |
| 15 lb. CF | | | |
| 15 lb. CB | CFB(I)-CFB(II)bond | CFB(II)-CF | Good |
| 17 lb. CFB(I) | weak | bond very weak | |
| 17 lb. CFB(II) | CFB(II)-CF bond | | |
| 15 lb. CF | weak | | |
| 22 lb. CB | Blocking | Reverse padding | Good |
| 15 lb. CF | All bonds equal | | Very slight blocking |

Successful edge-padding results means that there is successful bonding between coated sheets, no bonding between uncoated sheets and that the forms separate into individual sets upon fanning.

The compositions of the prior art adhesives used in the foregoing tests were as follows (Weight percent in a water medium):

| Adhesive #1 | |
|---|---|
| 10.9% | acrylic latex solids |
| 20% | ethylene glycol monomethyl ether |
| 8% | denatured alcohol (denatured with 5 gallons of commercial methanol per 100 gallons of 95% ethanol, known as "Formula 3A") |
| 0.8% | "Tamol" surface active agent (sodium salt of polymeric carboxylic acid) |
| Adhesive #2 | |
| 10.6% | acrylic latex solids |
| 20% | ethylene glycol monomethyl ether |
| 8% | denatured alcohol (as defined above) |

The invention being thus described, it will be obvious that the same may be varied in many ways. Such variations are not to be regarded as a departure from the spirit and scope of the invention, and all such modifications are intended to be included within the scope of the following claims.

What is claimed is:

1. A process for making form sets from carbonless copy paper, comprising the steps of:

(a) applying to an edge of a stack of sheets of said copy paper a non-aqueous composition selected from the group consisting of silicone resin solution sprays, substantially volatile aliphatic hydrocarbons, silicone resin solutions and solutions of resins in an aliphatic hydrocarbon solvent, (b) drying said non-aqueous composition, (c) applying an adhesive to said edge, (d) drying said adhesive, and (e) fanning said stack to separate the adhesively united unit form sets therefrom.

2. The process of claim 1, wherein the non-aqueous composition is selected from the group consisting of a silicone resin solution spray and a silicone resin solution.

3. The process of claim 2, wherein the non-aqueous composition is a silicone resin solution spray.

4. The process of claim 2, wherein the non-aqueous composition is a silicone resin solution.

5. The process of claim 1, wherein the non-aqueous composition is a substantially volatile aliphatic hydrocarbon.

6. The process of claim 5, wherein the aliphatic hydrocarbon has from 7 and 10 carbon atoms.

7. The process of claim 1, wherein the non-aqueous composition is a mixture of long chain saturated hydrocarbons.

8. The process of claim 1, wherein the non-aqueous composition is an organic solvent solution of an organosiloxane polymer.

9. The process of claim 1, wherein the non-aqueous composition is an organic solvent solution of a styrene resin.

* * * * *

UNITED STATES PATENT AND TRADEMARK OFFICE

CERTIFICATE OF CORRECTION

PATENT NO. : 4,230,514

DATED : October 28, 1980

INVENTOR(S) : William J. Becker, et al.

It is certified that error appears in the above–identified patent and that said Letters Patent are hereby corrected as shown below:

Column 6, Claim 6, line 44, change "and" to --to--.

Signed and Sealed this

*Third* Day of *March 1981*

[SEAL]

*Attest:*

RENE D. TEGTMEYER

*Attesting Officer*

*Acting Commissioner of Patents and Trademarks*